(12) United States Patent
Momosaki

(10) Patent No.: US 7,970,257 B2
(45) Date of Patent: Jun. 28, 2011

(54) IMAGE DISPLAY METHOD AND ELECTRONIC APPARATUS IMPLEMENTING THE IMAGE DISPLAY METHOD

(75) Inventor: Kohei Momosaki, Mitaka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/337,794

(22) Filed: Dec. 18, 2008

(65) Prior Publication Data

US 2009/0185745 A1    Jul. 23, 2009

(30) Foreign Application Priority Data

Jan. 23, 2008    (JP) .................................. 2008-012822

(51) Int. Cl.
*H04N 9/80* (2006.01)
(52) U.S. Cl. ....................................................... 386/241
(58) Field of Classification Search ............... 375/240.1; 386/52, 124–126, 241, 248, 239; 348/564
See application file for complete search history.

(56) References Cited

U.S. PATENT DOCUMENTS

| | | | |
|---|---|---|---|
| 6,347,114 B1 * | 2/2002 | Blanchard | 375/240 |
| 6,449,608 B1 * | 9/2002 | Morita et al. | 1/1 |
| 7,630,613 B2 * | 12/2009 | Murabayashi et al. | 386/69 |
| 2007/0172194 A1 | 7/2007 | Suzuki | |
| 2008/0155609 A1 * | 6/2008 | Lee | 725/62 |

FOREIGN PATENT DOCUMENTS

| | | | |
|---|---|---|---|
| EP | 1051034 | * | 11/2000 |
| EP | 1074923 | * | 7/2001 |
| JP | 9-231728 | | 9/1997 |
| JP | 2000/023104 | * | 1/2000 |
| JP | 2002-152665 | | 5/2002 |
| JP | 2003-264783 | | 9/2003 |
| JP | 2006/301872 | * | 11/2006 |
| JP | 2007-199944 | | 8/2007 |
| JP | 2007-251816 | | 9/2007 |
| JP | 2007-288594 | | 11/2007 |

OTHER PUBLICATIONS

Machine generated translation of JP 2006-301872, Kataoka et al, Nov. 2006.*
Machine generated translation of JP 2000-023104, Kato et al, Jan. 2000.*
Japanese Patent Application No. 2008-12822 Notice of Reasons for Rejection mailed Feb. 24, 2009 (English Translation).

* cited by examiner

*Primary Examiner* — David E Harvey
(74) *Attorney, Agent, or Firm* — Blakely, Sokoloff, Taylor & Zafman LLP

(57) ABSTRACT

According to one embodiment, an electronic apparatus comprises an image extraction module, an image list display process module, and a playback module. The image extraction module extracts a plurality of representative images from a sequence of video content data, and outputs time stamp information which is indicative of a time point at which each of the plurality of extracted representative images appears in the video content data. The image list display process module displays, on a display area, a list of representative images appearing in a period from a start position to a predetermined display constraining position of the sequence of the video content data among the plurality of extracted representative images, and constrains the display of the representative images appearing after the display constraining position among the plurality of representative images. The playback module plays back the video content data in response to input of a playback request event.

8 Claims, 14 Drawing Sheets

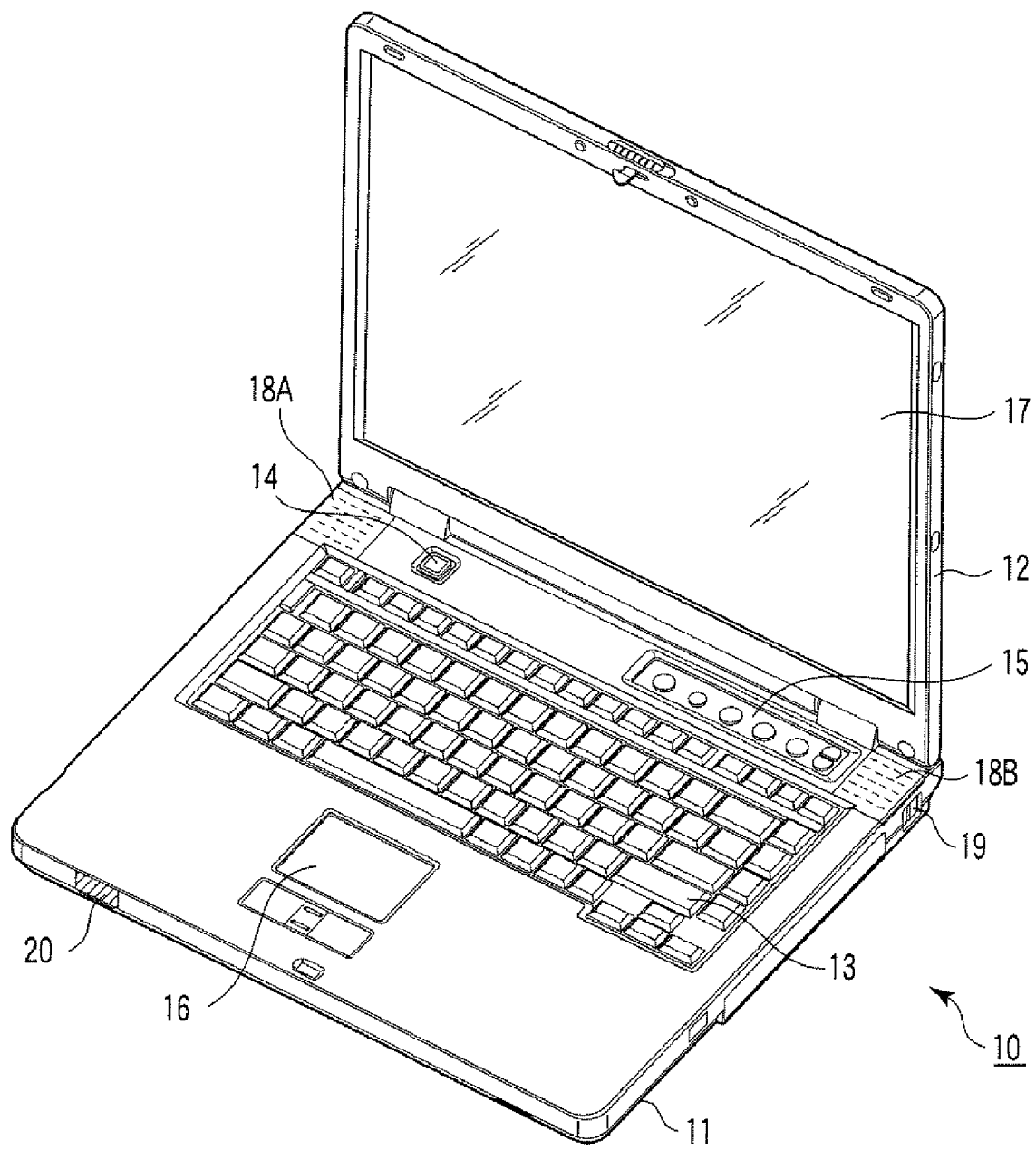
F I G. 1

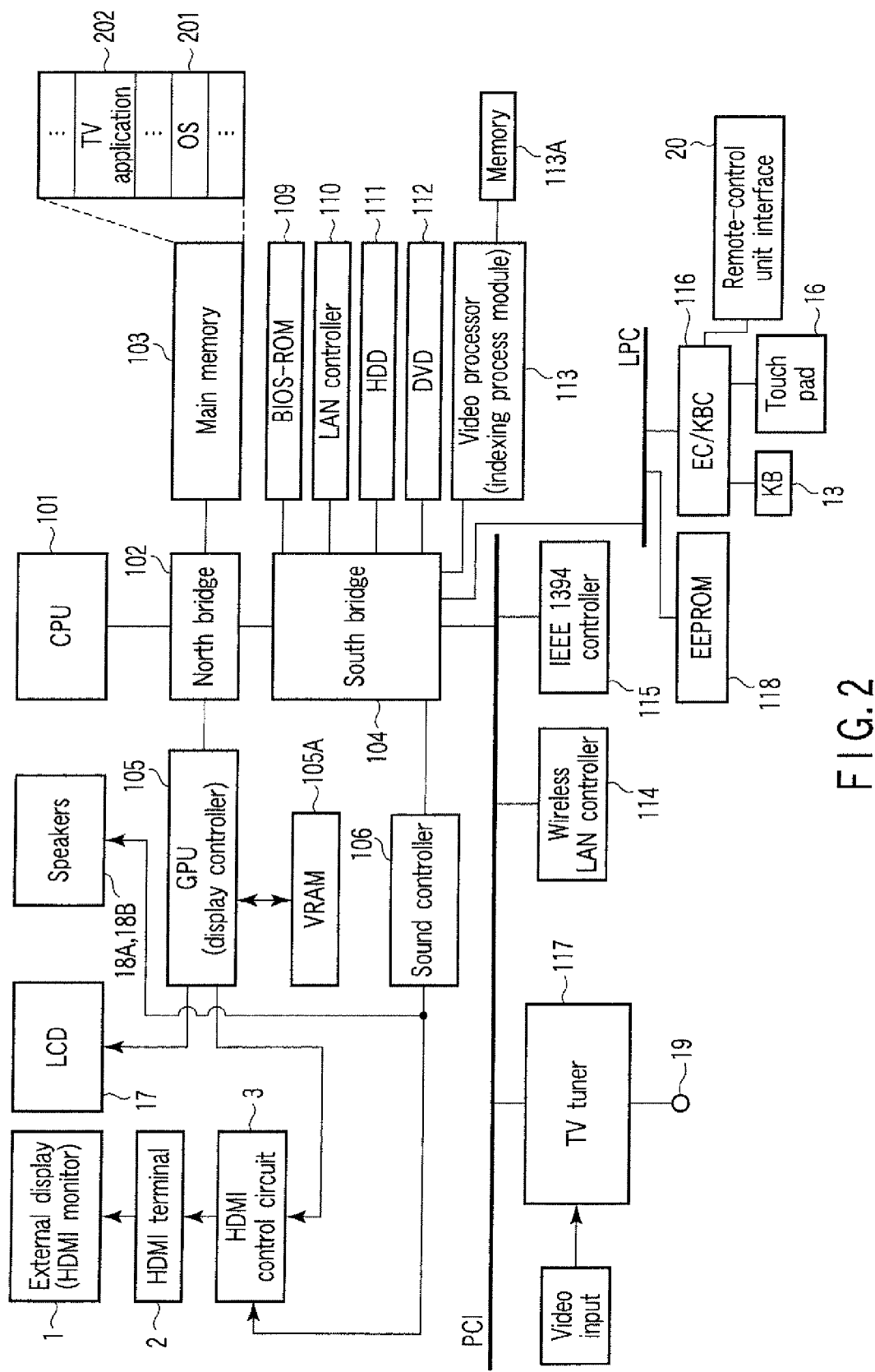
F I G. 2

Attribute detection result information

CM section table

| CM section 1 | Start time, end time |
|---|---|
| CM section 2 | Start time, end time |
| ⋮ | ⋮ |

Music section table

| Music section 1 | Start time, end time |
|---|---|
| Music section 2 | Start time, end time |
| ⋮ | ⋮ |

Talk section table

| Talk section 1 | Start time, end time |
|---|---|
| Talk section 2 | Start time, end time |
| ⋮ | ⋮ |

Cheer/excitement level table

| Time | Cheer level | Excitement level |
|---|---|---|
| T1 | 10 | 5 |
| T2 | 20 | 5 |
| T3 | 10 | 6 |
| ⋮ | ⋮ | ⋮ |

F I G. 4

| Content data ID | Played back | Playback point | Rearmost playback completion point |
|---|---|---|---|
| | | | |
| | | | |
| | | | |
| | | | |
| | | | |

FIG. 5

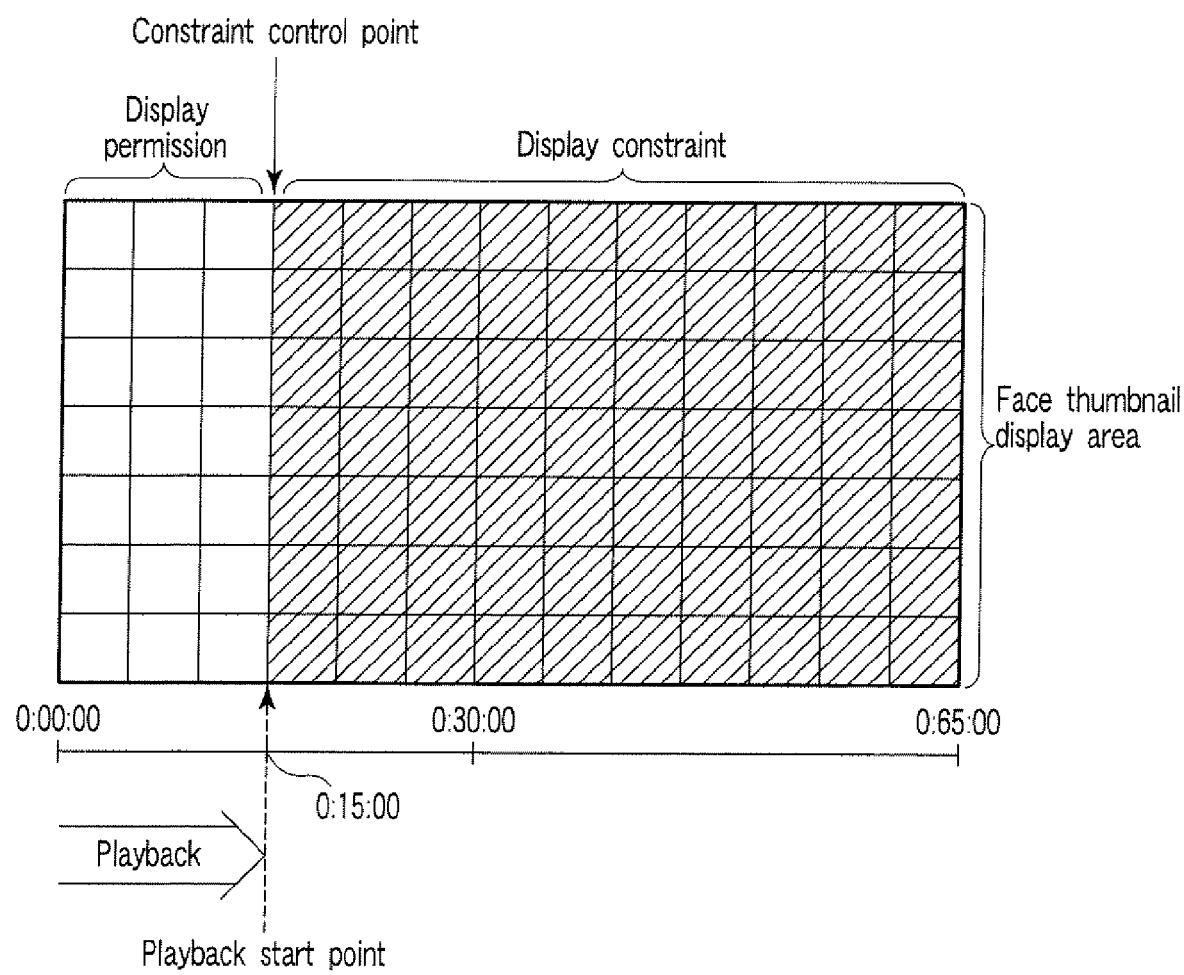
F I G. 11

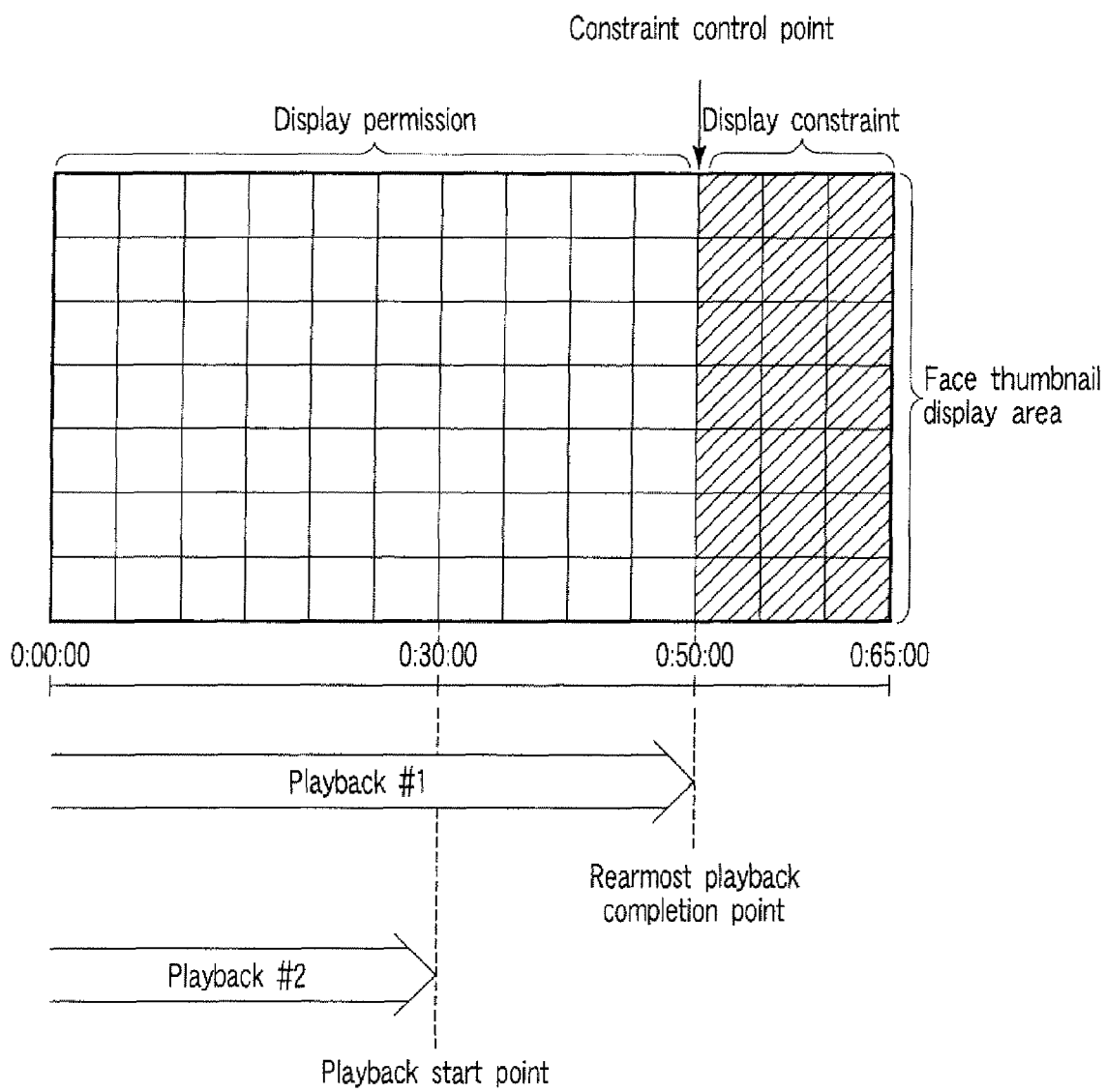
F I G. 12

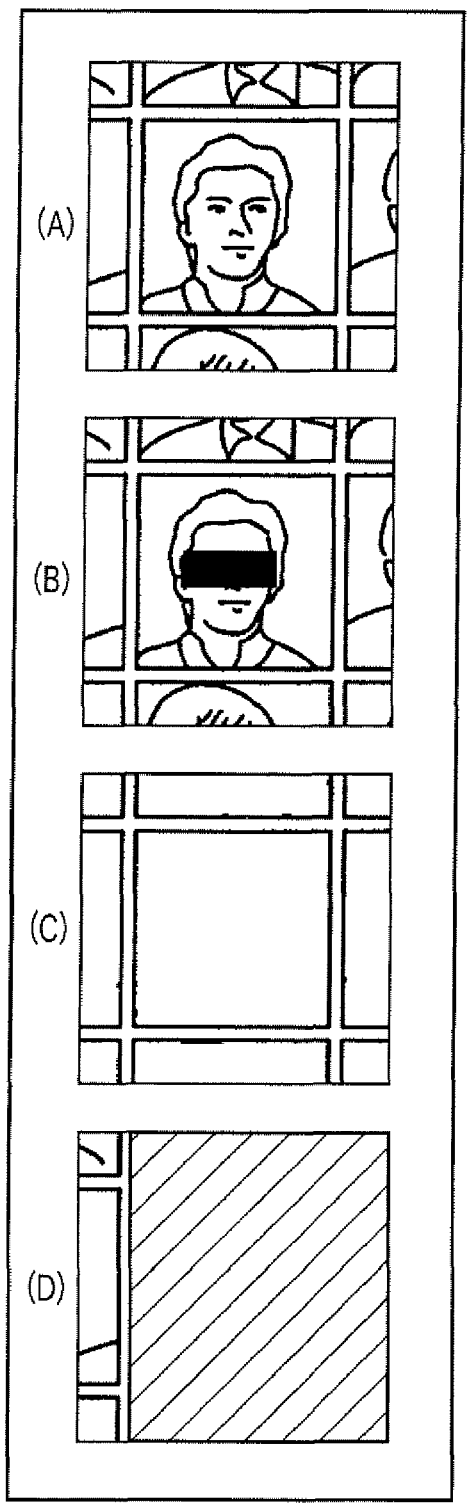
F I G. 14

IMAGE DISPLAY METHOD AND ELECTRONIC APPARATUS IMPLEMENTING THE IMAGE DISPLAY METHOD

CROSS-REFERENCE TO RELATED APPLICATIONS

This application is based upon and claims the benefit of priority from Japanese Patent Application No. 2008-012822, filed Jan. 23, 2008, the entire contents of which are incorporated herein by reference.

BACKGROUND

1. Field

One embodiment of the invention relates to an electronic apparatus and an image display method for displaying a list of images extracted from video content data.

2. Description of the Related Art

In general, an electronic apparatus, such as a video recorder or a personal computer, is capable of recording and playing back various video content data such as TV broadcast program data. In this case, although titles are added to the respective video content data stored in the electronic apparatus, it is difficult for a user to understand, from the title alone, what kind of content each video content data has. In order to understand the content of each video content data, it is thus necessary to play back the video content data. In the case of playing back video content data of a long total time, however, even if a fast-forward function or the like is used, a great deal of time is needed.

Jpn. Pat. Appln. KOKAI Publication No. 2007-288594 discloses a recording/playback apparatus for displaying thumbnail images corresponding to content stored in a recording medium. This recording/playback apparatus has a function of detecting thumbnail images including those of persons so that all the detected thumbnail images are not displayed for parental control.

In the meantime, the image list display function for displaying a list of the thumbnail images of the video content data is advantageous in that it can present an outline of the video content data to a user, but on the other hand, it can impair the viewing/listening value of the video content data due to excessive presentation of information.

For example, in the case of the video content data for a movie, a drama or sports, it may be better not to previously present, for example, the development or ending of a story to the user. If the list of the thumbnail images is simply displayed, there is a possibility that the development or ending of the story is previously presented to the user.

It is therefore necessary to realize a new function capable of presenting an outline of video content data to the user without impairing the viewing/listening value of the video content data.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an exemplary perspective view showing an example of the external appearance of an electronic apparatus according to an embodiment of the present invention;

FIG. 2 is an exemplary block diagram showing an example of the system configuration of the electronic apparatus according to the embodiment;

FIG. 4 is an exemplary view showing an example of section attribute information (attribute detection result information) which is used in the electronic apparatus according to the embodiment;

FIG. 5 is an exemplary view showing an example of playback history information which is used in the electronic apparatus according to the embodiment;

FIG. 11 is an exemplary view showing an example of a display constraining position used to constrain the display of the face thumbnail display area included in the indexing view screen shown in FIG. 7;

FIG. 12 is an exemplary view showing another example of the display constraining position used to constrain the display of the face thumbnail display area included in the indexing view screen shown in FIG. 7;

FIG. 14 is an exemplary view showing several examples of a display constraining process executed by the electronic apparatus according to the embodiment.

DETAILED DESCRIPTION

Figure 3:
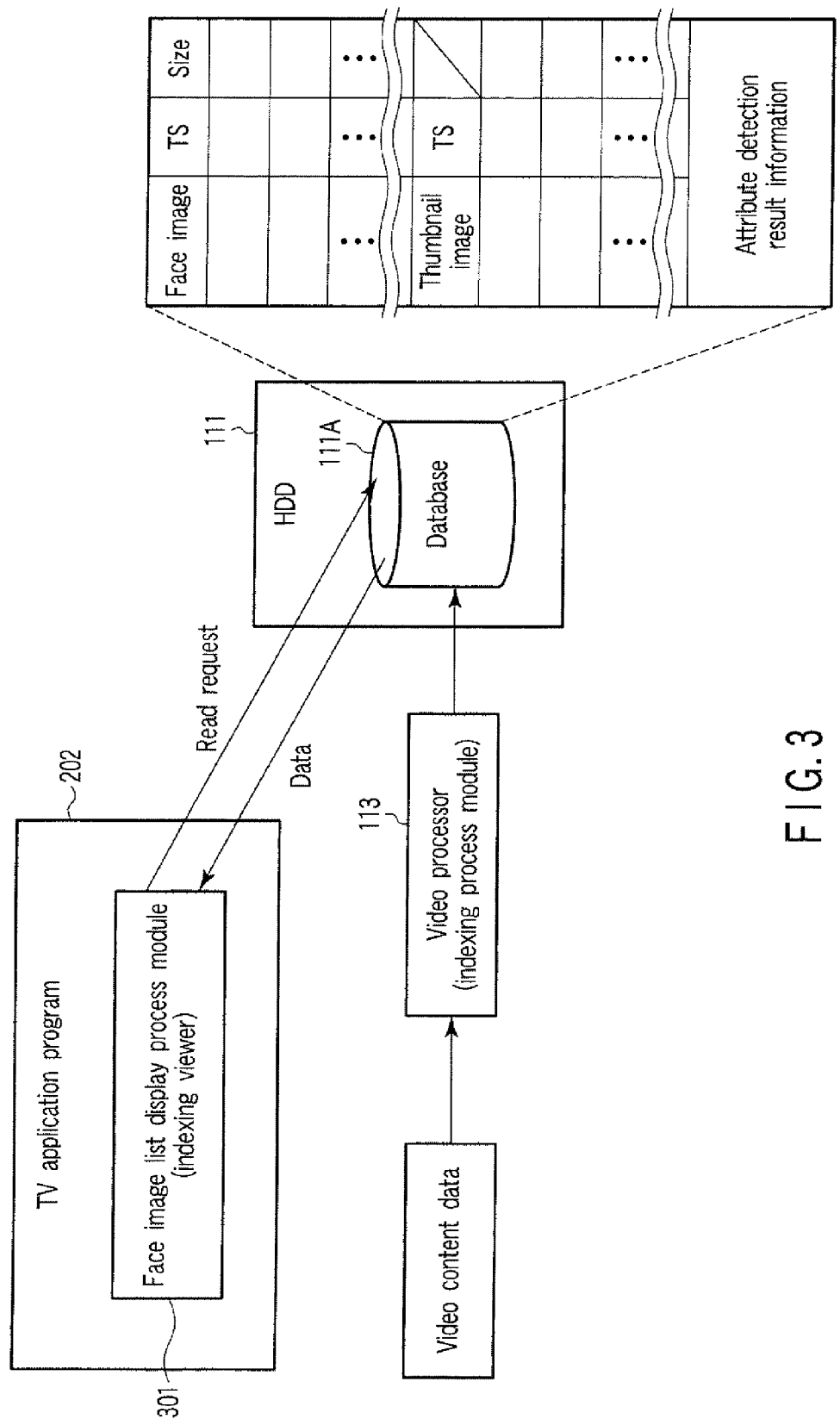
FIG. 3 is an exemplary block diagram for describing a face image list display function of the electronic apparatus according to the embodiment.

Various embodiments according to the invention will be described hereinafter with reference to the accompanying drawings. In general, according to one embodiment of the invention, there is provided an electronic apparatus comprising: an image extraction module configured to extract a plurality of representative images from a sequence of video content data, and to output time stamp information which is indicative of a time point at which each of the plurality of extracted representative images appears in the sequence of video content data; an image list display process module configured to display, on a display area, a list of representative images appearing in a period from a start position to a predetermined display constraining position of the sequence of the video content data among the plurality of extracted representative images, and to constrain the display of the representative images appearing after the display constraining position among the plurality of representative images; and a playback module configured to play back the video content data in response to input of a playback request event.

To begin with, referring to FIG. 1 and FIG. 2, the structure of an electronic apparatus according to an embodiment of the invention is described. The electronic apparatus according to this embodiment is realized, for example, by a notebook portable personal computer 10 functioning as an information processing apparatus.

The personal computer 10 is capable of recording and playing back video content data (audio-visual content data) such as broadcast program data and video data which is input from an external device. Specifically, the personal computer 10 has a television (TV) function for executing viewing/listening and recording of broadcast program data which is broadcast by a TV broadcast signal. This TV function is realized, for example, by a TV application program which is preinstalled in the personal computer 10. In addition, the TV function includes a function of recording video data which is input from an external AV device, and a function of playing back recorded video data and recorded broadcast program data.

Further, the personal computer 10 has an image list display function for displaying a list of representative images such as images of objects which appear in video content data such as video data and broadcast program data stored in the personal computer 10, for instance, a list of face images of persons who appear in the video content data. This face image list display function is implemented, for example, as one of the functions included in the TV function. The face image list display function is one of video indexing functions for presenting to a user, for instance, outlines of video content data selected as a navigation target by the user. This face image list display function can present, to the user, which person appears in which time zone throughout the whole navigation target video content data. In addition, the face image list display function can display the list of face images, with attention being paid to a predetermined attribute section included in the video content data.

This face image list display function also includes a function (display constraining function) of constraining the display of face images appearing in a particular period (display constraining period) such as the second half of the video content data in order to set the face images appearing in the display constraining period into an invisible state (including the state of the face images which is difficult to visually recognize), instead of displaying, on a display area, the face images appearing in the whole period from a start position to an end position of a sequence of the video content data. In this case, a group of face images appearing in periods other than the display constraining period, for instance, in the first half of the video content data is only displayed on the display area in a visible state.

For instance, the face images appearing in the display constraining period are subjected to processing such as blurring, scaling down or hiding such that the face images appearing in the display constraining period can be set into an invisible state. Needless to say, the face images appearing in the display constraining period may not be displayed on the display area.

FIG. 1 is a perspective view that shows the state in which a display unit of the computer 10 is opened. The computer 10 comprises a computer main body 11 and a display unit 12. A display device that is composed of a thin film transistor liquid crystal display (TFT-LCD) 17 is built in the display unit 12.

The display unit 12 is attached to the computer main body 11 such that the display unit 12 is freely rotatable between an open position where a top surface of the computer main body 11 is exposed, and a closed position where the top surface of the computer main body 11 is covered. The computer main body 11 has a thin box-shaped casing. A keyboard 13, a power button 14 for powering on/off the computer 10, an input operation panel 15, a touch pad 16 and speakers 18A, 18B are disposed on the top surface of the computer main body 11.

The input operation panel 15 is an input device that inputs an event corresponding to a pressed button. The input operation panel 15 has a plurality of buttons for activating a plurality of functions. The buttons include operation buttons for controlling a TV function (viewing/listening of broadcast program data/video data, recording of broadcast program data/video data, and playback of recorded broadcast program data/video data). In addition, a remote-control unit interface module 20, which executes communication with a remote-control unit that remotely controls the TV function of the computer 10, is provided on a front surface of the computer main body 11. The remote-control interface module 20 is composed of, e.g. an infrared signal receiving module.

An antenna terminal 19 for receiving TV broadcast signals is provided, for example, on a right side surface of the computer main body 11. In addition, on a rear surface of the computer main body 11, there is provided an external display connection terminal corresponding to, e.g. the high-definition multimedia interface (HDMI) standard. The external display connection terminal is used to output video data (motion video data), which is included in video content data such as broadcast program data, to an external display.

Referring now to FIG. 2, the system configuration of the computer 10 is described next.

As shown in FIG. 2, the computer 10 includes a CPU 101, a north bridge 102, a main memory 103, a south bridge 104, a graphics processing unit (GPU) 105, a video memory (VRAM) 105A, a sound controller 106, a BIOS-ROM 109, a LAN controller 110, a hard disk drive (HDD) 111, a DVD drive 112, a video processor 113, a memory 113A, a wireless LAN controller 114, an IEEE 1394 controller 115, an embedded controller/keyboard controller IC (EC/KBC) 116, a TV tuner 117, and an EEPROM 118.

The CPU 101 is a processor which controls the operation of the computer 10. The CPU 101 executes an operating system (OS) 201 and various application programs such as a TV application program 202, which are loaded from the hard disk drive (HUD) 111 into the main memory 103. The TV application program 202 is software for executing the TV function. The TV application program 202 executes, for example, a live playback process for viewing/listening to broadcast program data which is received by the TV tuner 117 and is currently broadcast, a recording process for recording received broadcast program data in the HOD 111, and a playback process for playing back broadcast program data/video data which is recorded in the HDD 111. The CPU 101 also executes a basic input/output system (BIOS) that is stored in the BIOS-ROM 109. The BIOS is a program for hardware control.

The north bridge 102 is a bridge device that connects a local bus of the CPU 101 and the south bridge 104. The north bridge 102 includes a memory controller that access-controls the main memory 103. The north bridge 102 also has a function for executing communication with the GPU 105 via, e.g. a PCI EXPRESS serial bus.

The GPU 105 is a display controller for controlling the LCD 17 that is used as a display monitor of the computer 10. A display signal, which is generated by the CPU 105, is sent to the LCD 17. In addition, the CPU 105 can send a digital video signal to an external display device 1 via an HDMI control circuit 3 and an HOMI terminal 2.

The HDMI terminal 2 is the above-mentioned external display connection terminal. The HOMI terminal 2 can send both a non-compressed digital video signal and a digital audio signal via a single cable to the external display device 1 such as a TV. The HDMI control circuit 3 is an interface for sending the digital video signal to the external display device 1, which is called "HDMI monitor", via the HOMI terminal 2.

The south bridge 104 controls the devices on a low pin count (LPC) bus, and the devices on a peripheral component interconnect (PCI) bus. In addition, the south bridge 104 includes an integrated drive electronics (IDE) controller for controlling the hard disk drive (HDD) 111 and DVD drive 112. The south bridge 104 also includes a function for executing communication with the sound controller 106.

Further, the video processor 113 is connected to the south bridge 104 via, e.g. a PCI EXPRESS serial bus.

The video processor 113 is a processor which executes various processes relating to the above-described video indexing. The video processor 113 functions as an indexing process module for executing a video indexing process. Specifically, in the video indexing process, the video processor 113 extracts a plurality of representative images from the sequence of the motion video data which is included in the video content data, and outputs, e.g. time stamp information indicating time points at which the extracted representative images appear in the sequence of the video content data. As the representative images, it is possible to use, for example, face images of persons which appear in the sequence of the video content data. The extraction of face images is executed, for example, by a face detection process for detecting a face region from each frame of the motion video data included in video content data, and a cut-out process for cutting out the detected face region from the frame. The detection of the face region can be executed, for example, by analyzing the characteristics of the image of each frame and searching for a region having characteristics similar to those of a pre-prepared face image characteristic sample. The face image characteristic sample is characteristic data which is obtained by statistically processing face image characteristics of many persons.

Further, the video processor 113 executes, for example, a process of detecting a commercial (CM) section which is included in video content data, and an audio indexing process. In usual cases, the time length of each CM section is set at one of some preset time lengths. In addition, a silent period of a predetermined time length is present before and after the CM section. Thus, in the CM section detection process, for example, audio data included in the video content data is analyzed, and a silent section of a predetermined time length is detected. A section including partial data which is interposed between two successive detected silent sections and has a time length of a predetermined value or more is detected as a CM section.

The audio indexing process is an indexing process of analyzing audio data which is included in video content data, and detecting a music section in which music is played and a talk section in which a talk is made by a person, which are included in the video content data. In the audio indexing process, for example, the characteristics of the frequency spectrum of audio data are analyzed, and the music section and talk section are detected in accordance with the characteristics of the frequency spectrum. Since the characteristics of the frequency spectrum corresponding to the music section are different from the characteristics of the frequency spectrum corresponding to the talk section, the music section and talk section can be detected respectively by analyzing the characteristics of the frequency spectrum. In addition, a section having frequency spectrum characteristics (acoustic characteristics), in which the characteristic of the frequency spectrum corresponding to the music section and the characteristic of the frequency spectrum corresponding to the talk section are mixed, can be detected as an overlap section in which the music section overlaps with the talk section.

In the process of detecting the talk section, a speaker segmentation technique or a speaker clustering technique, for instance, is used. Thereby, a change of speakers is also detected. A period in which the same speaker (or the same speaker group) talks continuously becomes one talk section.

Furthermore, the audio indexing process executes a cheer level detection process of detecting a cheer level in each partial data (data of a fixed time length) in video content data, and an excitement level detection process of detecting an excitement level in each partial data in video content data.

The cheer level is indicative of a magnitude of a cheer. A cheer is a sound in which voices of many people are combined. The sound in which voices of many people are combined has a distribution of a specific frequency spectrum. In the cheer level detection process, the frequency spectrum of audio data included in video content data is analyzed, and a cheer level of each partial data is detected in accordance with an analysis result of the frequency spectrum. The excitement level is a volume level of a section in which a volume level of a certain fixed level or more occurs continuously for a predetermined time length or more. For instance, a volume level of a sound, such as relatively large applause or loud laugh, is the excitement level. In the excitement level detection process, the distribution of the volume of audio data included in video content data is analyzed, and the excitement level of each partial data is detected in accordance with the analysis result. In addition, the volume level itself can be used as an excitement level.

The memory 113A is used as a working memory of the video processor 113. A great number of arithmetic operations are required for executing the indexing process (the CM detection process, video indexing process and audio indexing process). In the present embodiment, the video processor 113, which is a dedicated processor and differs from the CPU 101, is used as a back-end processor, and the video processor 113 executes the indexing process. Therefore, the indexing process can be executed without increasing the load on the CPU 101. Since the CM detection process can be executed by analyzing audio data, as described above, the CM detection process is treated as one of the processes of the audio indexing process in the description below.

The sound controller 106 is a sound source device, and outputs audio data, which is to be played back, to the speakers 18A, 18B or to the HDMI control circuit 3.

The wireless LAN controller 114 is a wireless communication device which executes wireless communication of, e.g., the IEEE 802.11 standard. The IEEE 1394 controller 115 executes communication with an external device via an IEEE 1394 serial bus.

The embedded controller/keyboard controller IC (EC/KBC) 116 is a 1-chip microcomputer in which an embedded controller for power management and a keyboard controller for controlling the keyboard (KB) 13 and touch pad 16 are integrated. The embedded controller/keyboard controller IC (EC/KBC) 116 has a function of powering on/off the computer 10 in response to the user's operation of the power button 14. Further, the embedded controller/keyboard controller IC (EC/KBC) 116 has a function of executing communication with the remote-control unit interface 20.

The TV tuner 117 is a receiving device which receives broadcast program data that is broadcast by a television (TV) broadcast signal, and is connected to the antenna terminal 19. For example, the TV tuner 117 is realized as a digital TV tuner which can receive digital broadcast program data such as ground digital TV broadcast program data. The TV tuner 117 also has a function of capturing video data which is input from an external device.

Next, referring to FIG. 3, a description is given of a face image list display function which is executed by the TV application program 202.

The indexing process (video indexing process and audio indexing process) for video content data such as broadcast program data is executed by the video processor 113 that functions as the indexing process module, as described above.

Under the control of the TV application program 202, the video processor 113 executes the indexing process, for example, on video content data, such as recorded broadcast program data, which is designated by the user. In addition, the video processor 113 can execute, in parallel with the recording process for storing in the HDD 111 broadcast program data which is received by the TV tuner 117, the indexing process on this broadcast program data.

In the video indexing process (also referred to as "face image indexing process") the video processor 113 analyzes, in units of frames, motion video data that is included in the video content data. The video processor 113 extracts face images of persons from a plurality of frames which constitute motion video data, and outputs time stamp information indicating time points at which the extracted face images appear in the video content data. As the time stamp information corresponding to each face Image, use may be made of, for instance, an elapsed time from the start of video content data to the appearance of the face image, or the frame number of a frame from which the face image is extracted.

Further, the video processor 113 outputs a size (resolution) of each of the extracted face images. The face detection result data (face image, time stamp information TS, and size), which is output from the video processor 113, is stored in a database 111A as face image indexing information. The database 111A is a memory area which is provided in the HDD 111 for storing indexing data.

In the video indexing process, the video processor 113 further executes a thumbnail image acquisition process in parallel with the face image extraction process. A thumbnail image is an image (a down-scaled image) corresponding to each of a plurality of frames which are extracted, for example, at equal time intervals from the video content data. Specifically, the video processor 113 successively extracts frames, for example, at predetermined equal time intervals from the video content data, regardless of whether the frames include face images or not, and outputs images (thumbnail images) corresponding to the extracted frames and the time stamp information TS indicative of time points at which the thumbnail images appear in the video content data. The thumbnail image acquisition result data (thumbnails, time stamp information TS), which is output from the video processor 113, is also stored in the database 111A as thumbnail indexing information.

In the audio indexing process, the video processor 113 analyzes the acoustic characteristics of audio data which is included in the video content data, detects a plurality of kinds of attribute sections (CM section, music section, and talk section) which are included in the video content data, and outputs section attribute information which defines the time points of the start and end of each detected attribute section. The section attribute information can be composed, for example, in association with each attribute section, of time information indicative of the start time point and end time point of each attribute section. Alternatively, the section attribute information may be composed of information indicative of the start time point of the attribute section and information indicative of the time length of the attribute section.

This section attribute information is stored in the database 111A as attribute detection result information. Further, in the audio indexing process, the video processor 113 executes the above-described cheer level detection process and the excitement level detection process. The result of the cheer level detection process and the result of the excitement level detection process are also stored in the database 111A as part of the above-described attribute detection result information.

As is shown in FIG. 4, the attribute detection result information (section attribute information) is composed of, for example, a CM section table, a music section table, a talk section table and a cheer/excitement level table.

The CM section table stores CM section attribute information which is indicative of a start time point and an end time point of a detected CM section. In a case where a plurality of CM sections are present in a sequence from a start position to an end position of video content data, the CM section attribute information corresponding to these plural CM sections is stored in the CM section table. The CM section table stores start time information and end time information, which are indicative of the start time point and end time point of each of the detected CM sections.

The music section table stores music section attribute information which is indicative of a start time point and an end time point of a detected music section. In a case where a plurality of music sections are present in a sequence from a start position to an end position of video content data, the music section attribute information corresponding to these plural music sections is stored in the music section table. The music section table stores start time information and end time information, which are indicative of the start time point and end time point of each of the detected music sections.

The talk section table stores talk section attribute information which is indicative of a start time point and an end time point of a detected talk section. In a case where a plurality of talk sections are present in a sequence from a start position to an end position of video content data, the talk section attribute information corresponding to these plural talk sections is stored in the talk section table. The talk section table stores start time information and end time information, which are indicative of the start time point and end time point of each of the detected talk sections.

The cheer/excitement level table stores a cheer level and an excitement level in each partial data of a predetermined time length (time segments T1, T2, T3, . . . ) in video content data.

As is shown in FIG. 3, the TV application program 202 includes a face image list display process module 301 for executing the face image list display function. The face image list display process module 301 is realized, for example, as an indexing viewer program, and displays an indexing view screen for displaying an outline of video content data, by using indexing information (e.g. face image indexing information, thumbnail indexing information, and section attribute information) stored in the database 111A.

Specifically, the face image list display process module 301 reads out the face image indexing information (face images, time stamp information TS, and size) from the database 111A, and displays, with use of the face image indexing information, a list of face images of persons, who appear in the video content data, on a two-dimensional display area (hereinafter referred to as "face thumbnail display area") on the indexing view screen. In this case, the face image list display process module 301 divides a total time length of video content data into a plurality of time zones, for example, at equal time intervals, and selects a predetermined number of face images appearing in each time zone from the extracted face images. The face image list display process module 301 arranges and displays the selected predetermined number of face images, in units of time zones.

Specifically, the two-dimensional face thumbnail display area includes a plurality of face image display areas which are arranged in a matrix including a plurality of rows and a plurality of columns. A plurality of time zones, which constitute the total time length of the video content data, are allocated to the plurality of columns, respectively. To be more specific, for example, a plurality of time zones each having the same time length, which are obtained by dividing the total time length of the video content data at equal intervals by the number of these columns, are allocated to the plurality of columns, respectively. Needless to say, the time zone allocated to each column need not necessarily be of a fixed length of time.

On the basis of the time stamp information TS corresponding to each face image, the face image list display process module 301 displays face images, which belong to the time zone allocated to each column, on the same number of face image display areas as the number of rows belonging to each column, for example, by arranging the face images in the order of frequency of appearance of face images (in the order of detection time length of face images). In this case, for example, face images, the number of which is equal to the number of rows are selected, in the descending order of frequency of appearance, from the face images belonging to the time zone allocated to each column, and the selected face images are arranged from above to below in the order of frequency of appearance. Needless to say, the face images appearing in the time zone allocated to each column may be displayed, not in the order of frequency of appearance, but in the order of appearance of face images.

By this face image list display function, it becomes possible to easily and clearly present, to the user, which person appears in which time zone of the whole video content data. Specific structure examples of the face thumbnail display area will be described later with reference to FIG. 6 and the following figures.

In addition, the face image list display process module 301 reads out the thumbnail indexing information (thumbnails, time stamp information TS) from the database 111A, and displays, with use of the thumbnail indexing information, the thumbnail images on a thumbnail display area (hereinafter referred to as "bellows thumbnail display area") which is disposed on one of an upper side and a lower side of the face thumbnail display area, by arranging the thumbnail images in a line in the order of time of appearance.

Depending on video content data, there is a time zone in which no face image appears. Thus, by displaying the bellows thumbnail display area as well as the face thumbnail display area on the indexing view screen, it is possible to present to the user the content of video content data in the time zone in which no face image appears.

Further, the face image list display process module 301 reads out the section attribute information (CM section attribute information, music section attribute information, talk section attribute information) from the database 111A, and displays, on the basis of the section attribute information, a section bar, which includes bar areas indicative of positions (sections from start time points to end time points) of the attribute sections (CM section, music section, talk section) in the sequence from the start position to the end position of the video content data, on one of a lower side and an upper side of the face thumbnail display area on the indexing view screen.

By displaying the section bar on the indexing view screen, it becomes possible to present, to the user, in which attribute section (CM section, music section, talk section) a person corresponding to each face image in the face thumbnail display area appears. Therefore, the user can find, from the entire video content data, the data position from which playback is to be started, by considering the persons who appear and section attributes.

In addition, the face image list display process module 301 reads out the cheer level information and excitement level information from the database 111A, and displays, on the basis of the cheer level information and excitement level information, graphs which indicate a variation in cheer level and a variation in excitement level in the sequence from the start position to the end position of the video content data, on a level display area which is disposed on one of a lower side and an upper side of the face thumbnail display area on the indexing view screen.

By looking at this level display area, it becomes possible for the user to know in which part of the video content data a section in which a loud cheer occurs is present, and in which part of the video content data a section in which great excitement occurs is present. The user can find, from the entire video content data, the data position from which playback is to be started, by considering the persons who appear, section attributes, cheer level, and excitement level.

Furthermore, the face image list display process module 301 can execute the above-mentioned display constraining function when displaying a list of face images on the face thumbnail display area, in order to prevent the viewing/listening value of the video content data from being impaired by the display of the list of face images.

Specifically, the face image list display process module 301 displays, on the face thumbnail display area, a list of face images appearing in a period from a start position to a predetermined display constraining position (also referred to as "constraint control point") of a sequence of video content data, among a plurality of face images extracted from the video content data. The face image list display process module 301 constrains the display of the face images appearing after the display constraining position among the plurality of extracted face images to set the face images appearing after the display constraining position into an invisible state. The period from the start position to the display constraining position of the sequence of the video content data is a display permitting period which permits the display of the list of face images. The face images appearing during the display permitting period are displayed on the face thumbnail display area. A period after the display constraining position of the sequence of the video content data, for example, a period from the display constraining position to the end position of the sequence is the display constraining period which constrains (prohibits) the display of the list of face images. The display of the face images appearing in the display constraining period is thereby constrained, and these face images are set into an invisible state (including the state in which face images are difficult to visually recognize) so that the user cannot visibly recognize the face images.

The face image list display process module 301 classifies the plurality face images extracted from the video content data, into a first face image group belonging to the display permitting period and a second face image group belonging to the display constraining period. The face images belonging to the first face image group are displayed on the face thumbnail display area by the face image list display process module 301. On the other hand, the face images belonging to the second face image group are displayed on the face thumbnail display area, for example, in a state processed (blurred, downscaled or hidden) by the face image list display process module 301. Needless to say, the display itself of the face images belonging to the second face image group may be prohibited.

As a display constraining position, use can be made of, for instance, a time point after a lapse of a certain reference time from the start position of the sequence of the video content data. In this case, the reference time may be variably set depending on the total time length of the video content data. For example, a time ½, ⅔ or ¾ of the total time length of the video content data can be used as the reference time.

Further, the above-mentioned display constraining function may be only applied to un-played-back video content data, i.e., data which has never been played back. In this case, the face image list display process module 301 determines whether the video content data selected as a navigation target is played-back video content data which has been played back or un-played-back video content data which has never been played back.

When the navigation target video content data is the un-played-back video content data, the face image list display process module 301 displays a list of face images on the indexing view screen with use of the above-mentioned display constraining function. In this case, a time point after a lapse of a predetermined reference time from the start position of the sequence of the video content data is used as the display constraining position. Further, among a plurality of face images extracted from the video content data, a list of face images appearing in a period from the start position to the display constraining position of the sequence of the video content data is only displayed on the face thumbnail display area. Thereby, it is possible to prevent a situation where, for example, the ending of a story in the un-played-back video content data which has never been played back is presented to the user, such that the possibility of impairing the viewing/listening value of the un-played-back video content data can be reduced.

When the navigation target video content data is the played-back video content data, the face image list display process module 301 displays, on the face thumbnail display area, a list of face images belonging to all the sections of the sequence of the video content data, without using the above-mentioned display constraining function.

In addition, even if the navigation target video content data is the played-back video content data which has been played back at least once, the video content data may have been played back only halfway. Therefore, the display constraining function is useful for the played-back video content data as well. In this case, the display constraining position may be adaptively set in accordance with the playback history of the video content data as follows:

When the navigation target video content data is the played-back video content data, for example, a time point (playback point) corresponding to a playback termination position in the previous playback process of the navigation target video content data can be used as the above-mentioned display constraining position. In this case, a section which has been already viewed/listened to, that is, a period from the start position to the playback termination position of the video content data is the display permitting period, and a period from the playback termination position to the end position is the display constraining period. In addition, a CM attribute period belonging to the display constraining period, for example, can also be treated as the display permitting period.

Furthermore, a time point corresponding to the rearmost playback termination position among the playback termination positions in the past playback processes of the played-back video content data can be used as the display constraining position.

Specifically, the TV application program 202 supports three kinds of playback processes "play", "resume" and "restart" as playback methods of playing back the played-back video content data. The "play" can only be performed for the un-played-back video content data which has never been played back. When the user instructs to execute the "play", the video content data is played back from the start position of its sequence. For the content which has been played back, the user can select one of the "resume" and "restart". When a playback resumption request event which requests to resume the playback of the video content data is input, that is, when the user instructs to execute the "resume", the video content data is played back from the playback termination position (playback point) in the previous playback process. When the user instructs to execute the "restart", the video content data is played back not from the playback point but from the start position of its sequence.

Therefore, in the case of the video content data which has been repeatedly played back/stopped many times, the playback point may be different from the rearmost playback termination position among the playback termination positions in the past playback processes. Thus, the time point corresponding to the rearmost playback termination position among the playback termination positions in the past playback processes is used as the display constraining position, such that the display constraining period can be more properly set.

In FIG. 5, there is shown an example of playback history information which is managed on a video-content-data basis by the TV application program 202.

This playback history information is stored in, for example, the database 111A. The playback history information indicates "content data ID", "played-back flag", "playback point" or "rearmost playback completion point" for each of the video content data stored in, for example, the HDD 111 or an optical disk medium. The "content data ID" is identification information (e.g., a file name, a title) for identifying the video content data. The "played-back flag" indicates whether the video content data has been played back. The "playback point" indicates a time point corresponding to the playback termination position in the previous playback process of the video content data. When the playback of video content data is stopped at the halfway point of the sequence of the video content data, the TV application program 202 stores the stop point in the database 111A as a playback point. The "rearmost playback completion point" indicates the rearmost playback termination position among the playback termination positions in the past playback processes of the video content data.

The face image list display process module 301 can adaptively control the display constraining position in accordance with the playback history information in FIG. 5.

Figure 6:
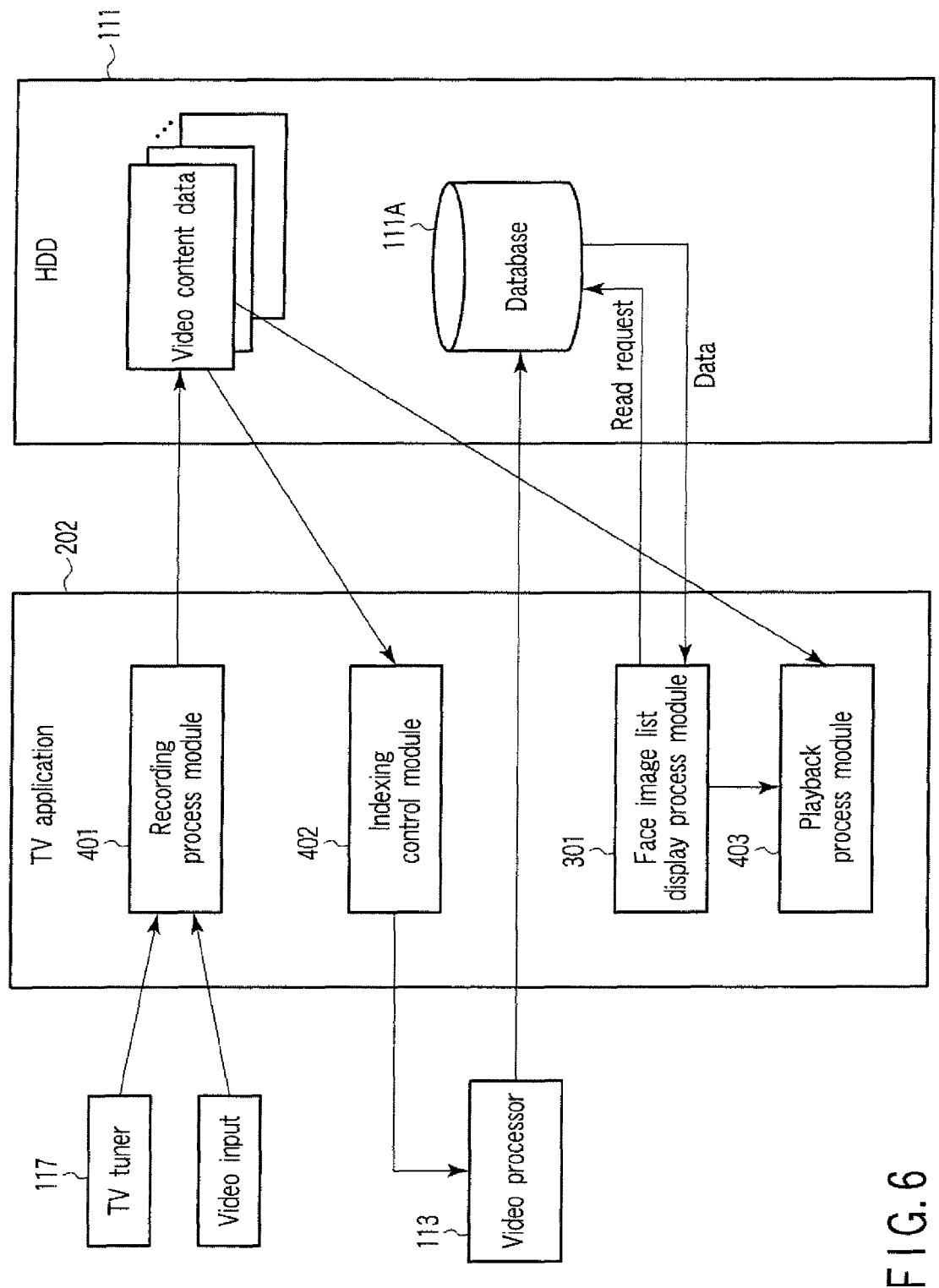
FIG. 6 is an exemplary block diagram showing the functional configuration of a program which is used in the electronic apparatus according to the embodiment.

Next, referring to FIG. 6, the functional configuration of the TV application program 202 is described.

The TV application program 202 includes, in addition to the above-described face image list display process module 301, a recording process module 401, an indexing control module 402 and a playback process module 403.

The recording process module 401 executes a recording process for recording in the HDD 111 broadcast program data which is received by the TV tuner 117 or video data which is input from an external device. In addition, the recording process module 401 executes a programmed-recording process for receiving, with use of the TV tuner 117, broadcast program data which is designated by programmed-recording information (channel number, date/time) that is preset by the user, and recording the received broadcast program data in the HDD 111.

The indexing control module 402 controls the video processor (indexing process module) 113 and causes the video processor 113 to execute the indexing process (video indexing process, audio indexing process). The user can designate whether the indexing process is to be executed or not, in association with each broadcast program data that is to be recorded. For example, as regards broadcast program data to be recorded, for which an instruction has been issued to execute the indexing process, the indexing process is automatically started in parallel with the process of recording the broadcast program data in the HDD 111. Further, the user may designate video content data, from among the video content data already stored in the HDD 111, for which the indexing process is to be executed.

The playback process module 403 executes a process for playing back each video content data stored in the HDD 111. In addition, the playback process module 403 has a function that when a playback request event is input by a user operation in the state in which one of face images in the face image list of certain video content data is selected, the playback process module 403 starts playback of the video content data from a time point that is a predetermined time before a time point at which the selected face image appears.

The user can determine a position at which the playback of the video content data is to be started while viewing the face image list.

The indexing process need not necessarily be executed by the video processor 113. For example, the TV application program 202 may be provided with a function for executing the indexing process. In this case, the indexing process is executed by the CPU 101 under the control of the TV application program 202.

Next, referring to FIG. 7 to FIG. 12, specific structures of the indexing view screen are described.

Figure 7:
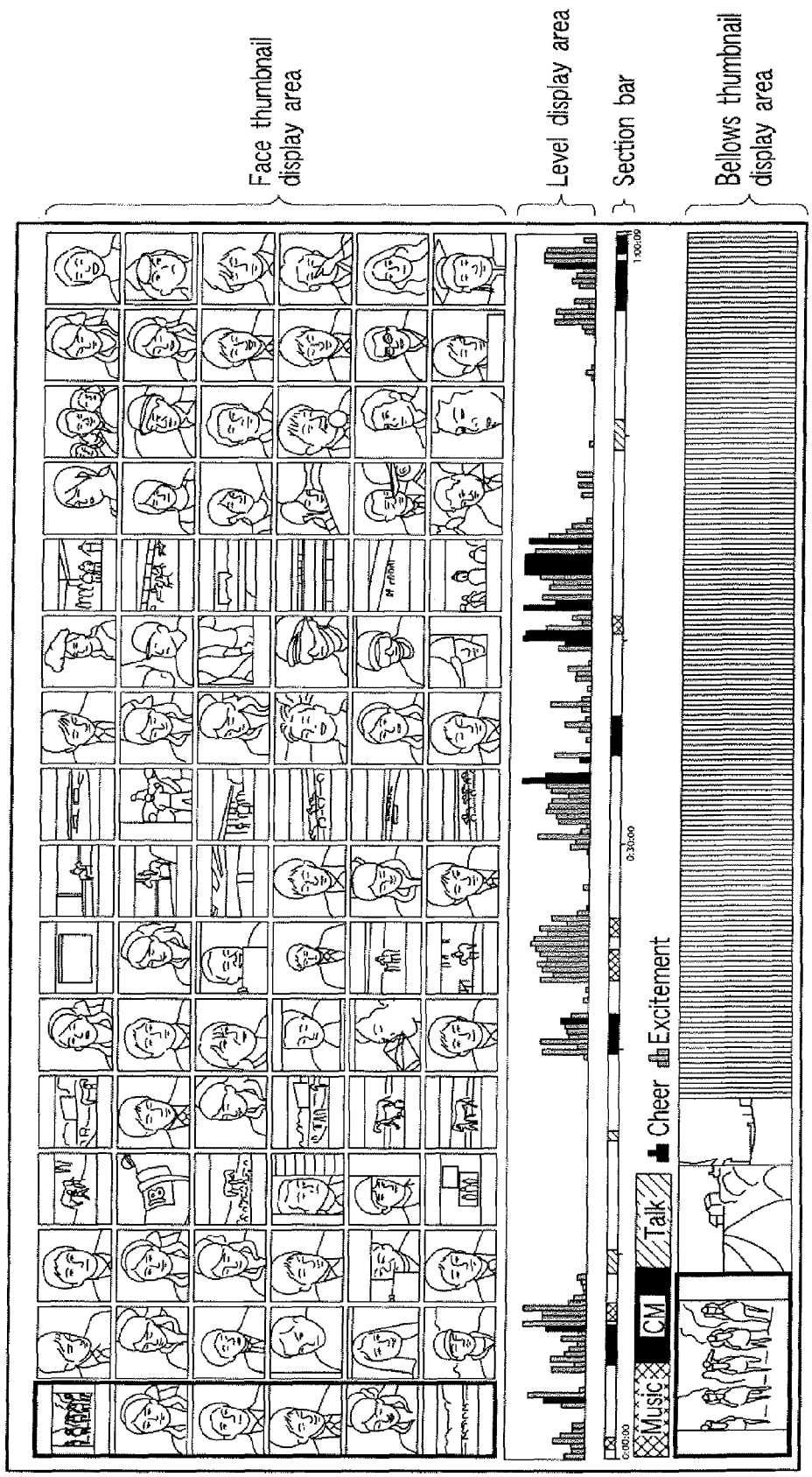
FIG. 7 is an exemplary view showing an example of an indexing view screen which is displayed on a display device by the electronic apparatus according to the embodiment.

FIG. 7 shows an example of an indexing view screen which is displayed on the LCD 17 by the face image list display process module 301. The indexing view screen is a screen which is obtained by subjecting certain video content data (e.g. broadcast program data) to the indexing process. The indexing view screen includes the above-described face thumbnail display area for displaying the list of face images, the above-described level display area, the above-described section bar, and the above-described bellows thumbnail display area for displaying the list of thumbnail images in a bellows format.

The term "bellows format", in this context, is a display format in which a selected thumbnail image is displayed in a normal size and other thumbnail images are displayed in laterally reduced sizes. In the case shown in FIG. 7, a left-end thumbnail image is selected.

The face image list display process module 301 displays a thumbnail image selected by a user operation in a first lateral width size, and displays other thumbnail images in lateral width sizes smaller than the first lateral width size. Specifically, the selected thumbnail image is displayed in the first lateral width size, and several thumbnail images in the vicinity of the selected thumbnail image are displayed so that their widths are reduced, and the rest of the thumbnail images are displayed with much smaller lateral widths. A rectangular frame may be further added to the selected thumbnail image.

The level display area displays a graph indicating a variation of the cheer level (a graph shown in a dark color in FIG. 7), and a graph indicating a variation of the excitement level (a graph shown in a light color in FIG. 7).

The section bar indicates a talk section, a music section and a CM section. In the section bar, a bar area of a certain color (a black strip area in FIG. 7) is displayed at a position of each CM section. At a position of each music section, a bar area of another color (a cross-hatched strip area in FIG. 7) is displayed. At a position of each talk section, a bar area of a further color (a hatched strip area in FIG. 7) is displayed. The user can select any one of the bar areas in the section bar by operating a button of the remote-control unit, or an up, down, left or right cursor key.

A list of a plurality of face images is displayed in the face thumbnail display area. When no face image is continuously detected for a given period or more, a thumbnail image of the whole frame may be displayed in the face thumbnail display area. Further, the thumbnail image of the whole frame may be displayed in the face thumbnail display area at every change of scene.

Figure 8:
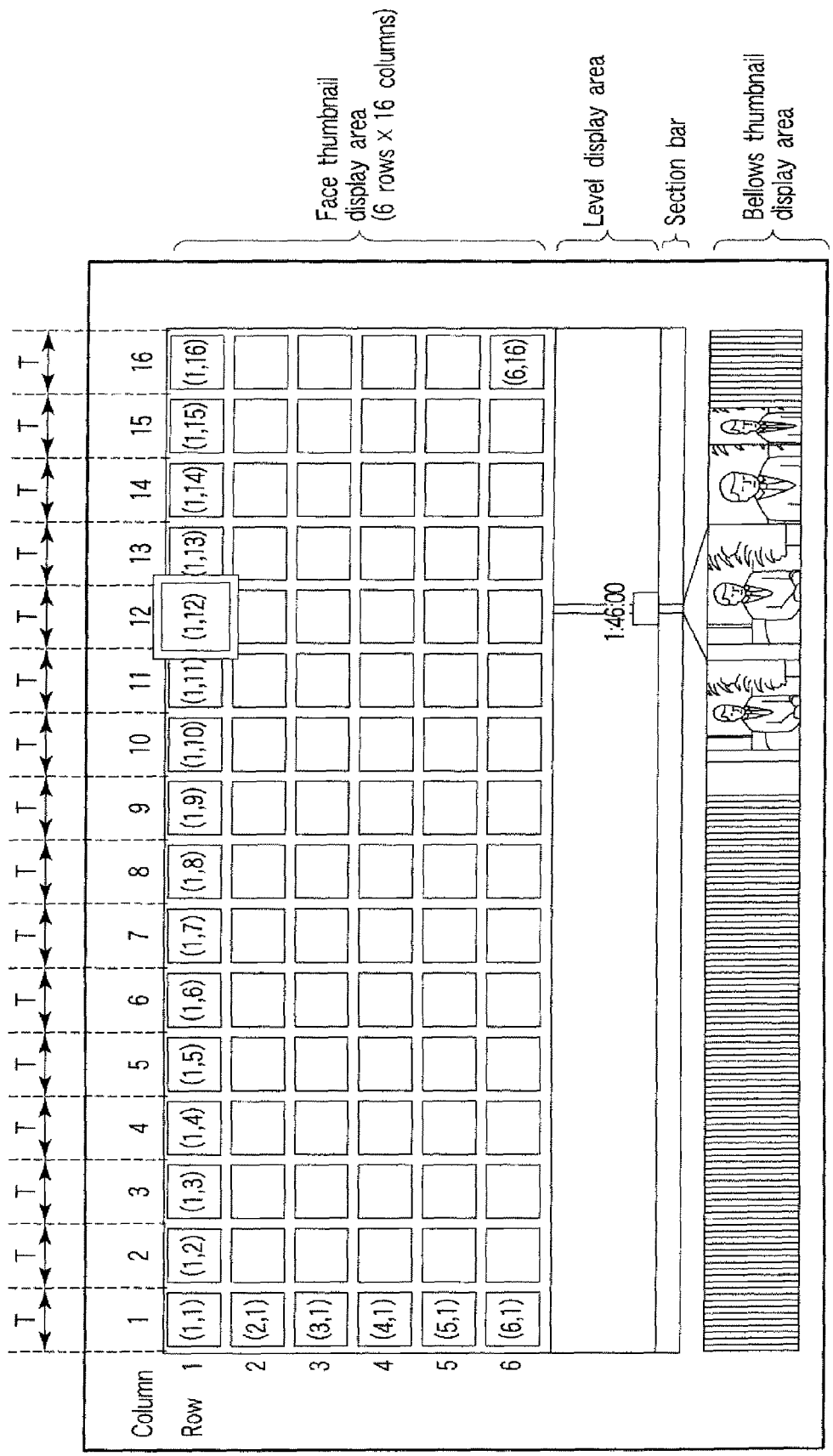
FIG. 8 is an exemplary view showing a structure example of a face thumbnail display area which is included in the indexing view screen shown in FIG. 7.

FIG. 8 shows an example of the structure of the face thumbnail display area.

The face thumbnail display area includes a plurality of face image display areas which are arranged in a matrix including a plurality of rows and a plurality of columns. In FIG. 8, the face thumbnail display area comprises 6 rows×16 columns. The number of face image display areas included in the face thumbnail display area is 96.

A plurality of time zones, each of which has the same time length T that is obtained by dividing the total time length of video content data by the number of columns (16) at equal time intervals, are allocated to columns 1 to 16, respectively.

For example, if the total time length of video content data is two hours, the two hours are divided into 16 time zones with equal time intervals. In this case, the time length T of each time zone is 7.5 minutes. For example, a time zone from 0:00:00 (the beginning) to 0:07:30 is allocated to column 1, a time zone from 0:07:30 to 0:15:00 is allocated to column 2, and a time zone from 0:15:00 to 0:22:30 is allocated to column 3. The time length T of each time zone varies in accordance with the total time length of video content data.

Needless to say, the length of the time zone, which is allocated to each of the plural columns, does not necessarily have to be the same.

On the basis of time stamp information corresponding to face images which are extracted by the video processor 113, the face image list display process module 301 displays the face images, which belong to the time zone allocated to each column, on the six face image display areas of the associated column by arranging the face images, for example, in the above-described order of frequency. In this case, the face image list display process module 301 selects face images, the number of which is equal to the number of rows (six), from the face images that belong to the time zone allocated to the column that is the object of the display process, and arranges and displays the selected face images, the number of which is equal to the number of rows.

As has been described above, in the face thumbnail display area, use is made of a time axis having a base point at a left end position (1, 1) and an end point of video content data at a right end position (6, 16).

The user can select the size of the face image, which is displayed on each face image display area of the face thumbnail display area, from among "large", "medium" and "small". The number of rows and the number of columns are varied in accordance with the size of the face image which is selected by the user. The relationship between the size of the face image and the numbers of rows and columns is as follows.

(1) "large": 3 rows×8 columns
(2) "medium": 6 rows×16 columns
(3) "small": 10 rows×24 columns.

In the case of "large", each face image is displayed with a size of, e.g. 180×180 pixels. In the case of "medium", each face image is displayed with a size of, e.g. 90×90 pixels. In the case of "small", each face image is displayed with a size of, e.g. 60×60 pixels. The default face image size is set at, for example, "medium".

Each face image in the face thumbnail display area is set in one of two states, namely, a non-selected "standard" state and a selected "focus" state. The size of the face image in the "focus" state is set to be greater than the size of the face image in the "standard" state (180×180, 90×90, or 60×60). FIG. 8 shows the case in which the face image at coordinates (1, 12) is in the "focus" state.

The number of thumbnail images, which are displayed in the bellows thumbnail display area, is set at one of, for example, 240, 144, 96, and 48 in accordance with the user setting. The default value is, e.g. 240.

The thumbnail image is set in one of two states, namely, a non-selected "standard" state and a selected "focus" state. The size of the thumbnail image in the "focus" state is displayed in a size greater than the size of the other thumbnail images.

Figure 9:
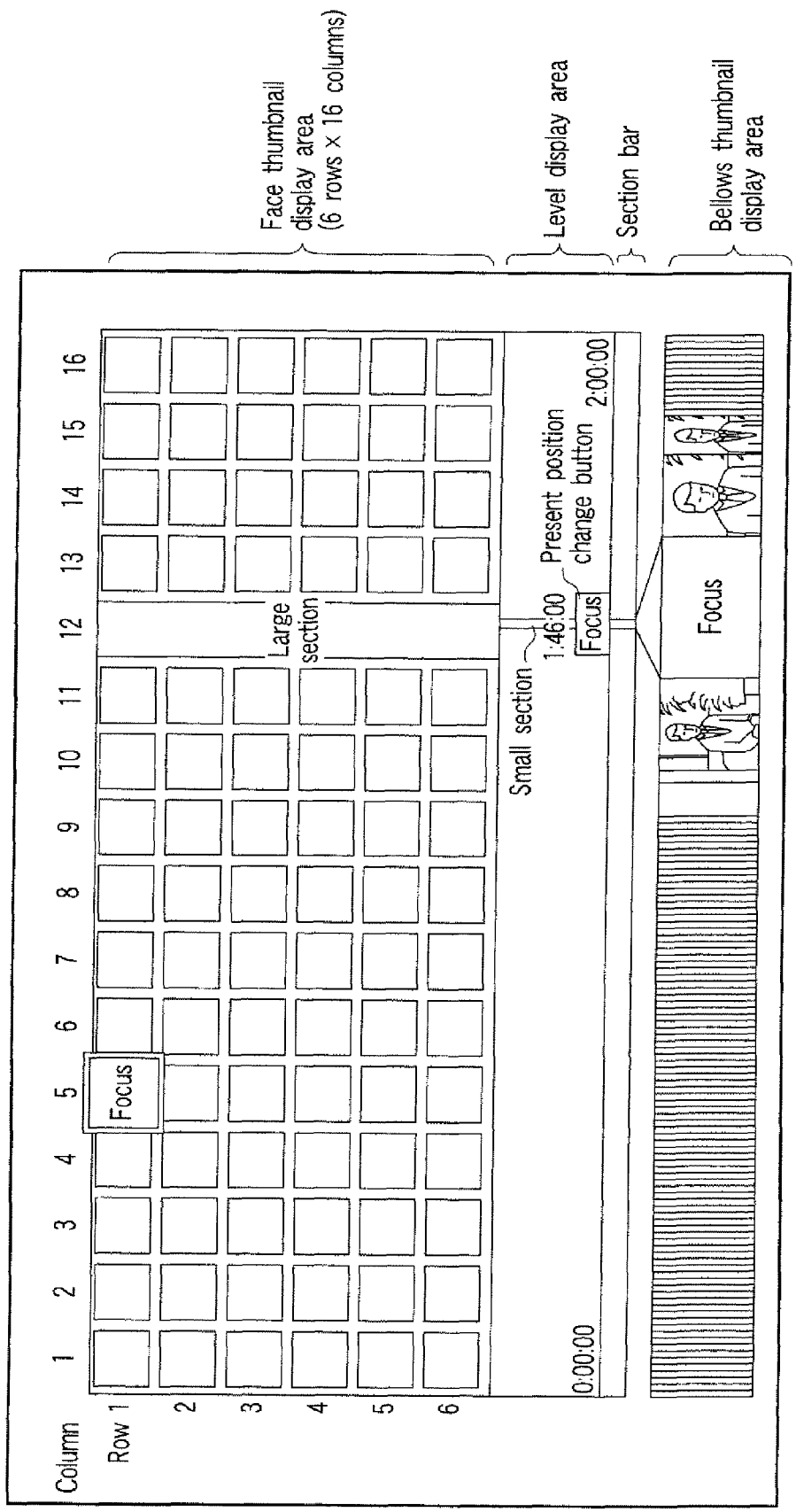
FIG. 9 is an exemplary view for explaining the relationship between the face thumbnail display area and a bellows thumbnail display area, which are included in the indexing view screen shown in FIG. 7.

Next, referring to FIG. 9, the relationship between the face thumbnail display area and the bellows thumbnail display area is described.

A set of face image display areas belonging to the same column, that is, each column in the face thumbnail display area, is referred to as "large section". Each of divisions of the "large section" is referred to as "small section". The number of small sections included in one large section is given by a quotient of the number of thumbnail images displayed in the bellows thumbnail display area, which are divided by the number of columns of the face thumbnail display area. For example, if the face thumbnail display area has a size of 6 rows×16 columns and the number of thumbnail images displayed in the bellows thumbnail display area is 240, the number of small sections included in one large section is 15 (=240÷16). One large section includes 15 small sections. In other words, 15 thumbnail images belong to the time zone corresponding to one large section.

When a certain thumbnail image on the bellows thumbnail display area is selected, the face image list display process module 301 selects, on the basis of time stamp information of the selected thumbnail image, a column (large section) from plural columns (plural large sections) in the face thumbnail display area, to which the time zone to which the selected thumbnail image belongs is allocated. The selected large section is a large section which includes the selected thumbnail image as a small section. The face image list display process module 301 displays with emphasis the selected large section. In this case, a frame, for example, is added to the selected large section.

Further, the face image list display process module 301 displays a vertical bar which connects the selected thumbnail image and the selected large section. The vertical bar (present position bar) is used in order to indicate to which of the 15 small sections, which are included in the selected large section, the small section corresponding to the selected thumbnail image corresponds. The vertical bar is displayed at the position of that small section of the 15 small sections included in the selected large section, which corresponds to the selected thumbnail image. For example, if the selected thumbnail image is the first image of the 15 thumbnail images belonging to the time zone corresponding to a certain large section, that is, the image corresponding to the first small section of the large section, the selected thumbnail image is connected to the left end of the large section by the vertical bar. On the other hand, for example, if the selected thumbnail image is the last image of the 15 thumbnail images belonging to the time zone corresponding to a certain large section, that is, the image corresponding to the last small section of the large section, the selected thumbnail image is connected to the right end of the large section by the vertical bar.

As has been described above, when a thumbnail image on the bellows thumbnail display area is selected, a column (large section), to which the time zone to which the selected thumbnail image belongs is allocated, is automatically selected from a plurality of columns in the face thumbnail display area. Thereby, the user can recognize to which of columns (large sections) in the face thumbnail display area the selected thumbnail image corresponds. Further, by the vertical bar, the user can also recognize to which time point in which column (large section) the selected thumbnail image corresponds.

Furthermore, the face image list display process module 301 displays, on the basis of the time stamp information of the selected thumbnail image, the time information on the indexing view screen, which indicates the time point at which the selected thumbnail image appears in the sequence of the video content data.

A "present position change" button is an operation button for changing a present position (thumbnail image which is selected, selected large section). If the user operates a left cursor key or a right cursor key in the state in which the "present position change" button is focused, the thumbnail image to be selected is shifted to the left or right, for example, in units of small sections.

Figure 10:
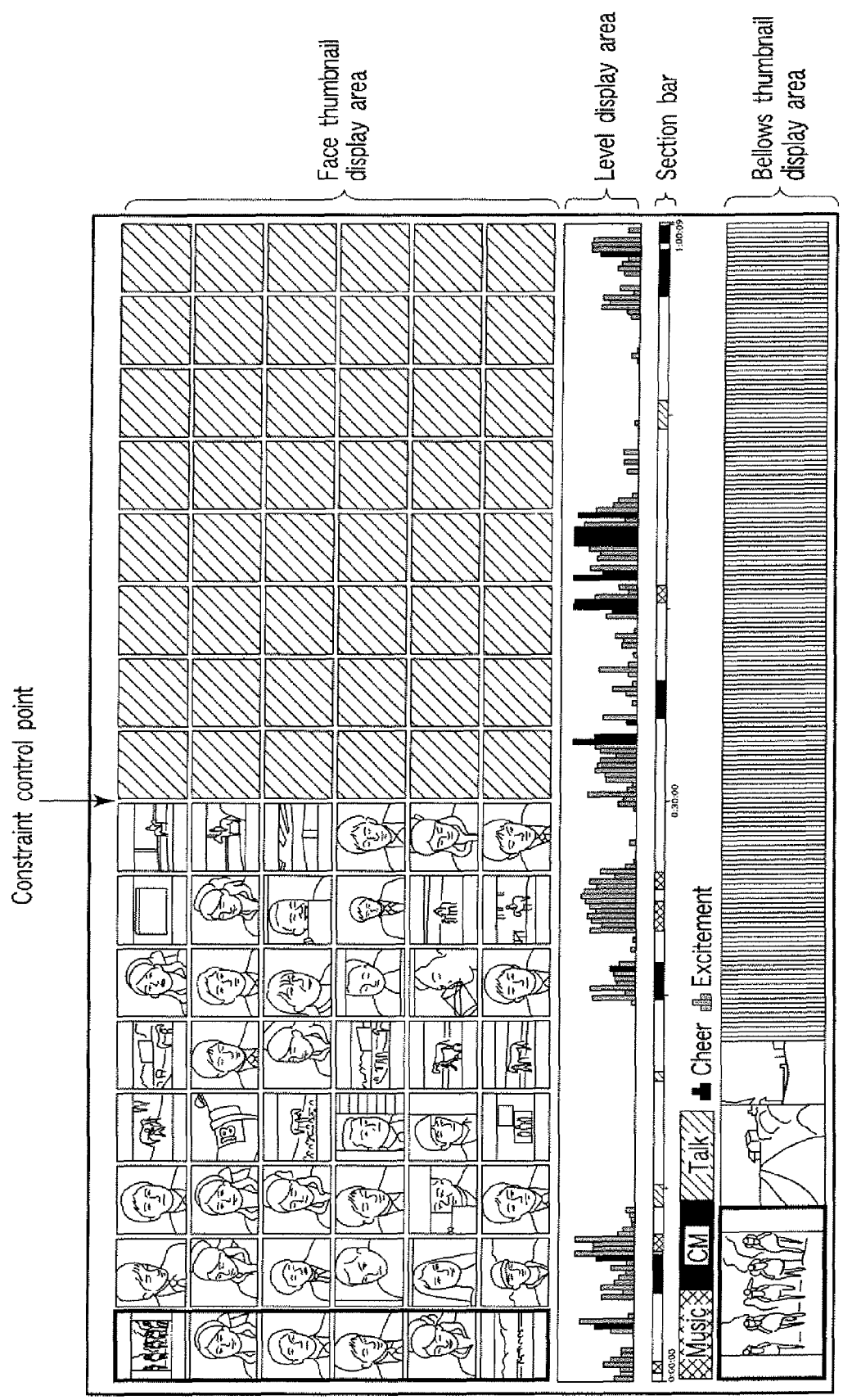
FIG. 10 is an exemplary view showing an example in which a display constraining function is applied to the face thumbnail display area included in the indexing view screen shown in FIG. 7.

FIG. 10 shows an example of face image list display in the case of using the display constraining function.

In the case assumed in FIG. 10, a time point corresponding to a border position between the eighth and ninth columns from the left on the face thumbnail display area is the display constraining position (display constraining point). The face image list display process module 301 arranges and displays representative images, which belong to the time zone allocated to each column, on the image display area of each of the columns (each of eight columns on the left end side) to which a time zone belonging to a period from a start position to a display constraining position (constraint control point) of a sequence of video content data is allocated. The face images to be displayed in the columns after the display constraining position (constraint control point) are set into an invisible state.

If, in this state, the present position is changed by, for example, the user's operation of the present position change button or the left or right key such that a column to which the time zone belonging to the period after the display constraining position is selected, the face image list display process module 301 executes a process for moving the display constraining position to the end position of the time zone allocated to the selected column. For example, if, in FIG. 10, the present position is moved to the ninth column from the left such that the ninth column is selected, the display constraining position is also moved from the border position between the eighth and ninth columns to a border position between the ninth and tenth columns (the end position of the time zone allocated to the selected ninth column) accordingly. Thus, the number of columns belonging to the display constraining period can be reduced stepwise in accordance with the user operation. That is, although the user is not able to see the face images belonging to the period after the display constraining position immediately after the display of the indexing view screen, the column to be selected is moved to the column belonging to the display constraining period as needed, such that the user is able to see the face images belonging to the period after the display constraining position.

FIG. 11 shows an example of face image list display in the case of using the above-mentioned playback point (also referred to as "playback start point") as the display constraining position.

If the previous playback process of the navigation target video content data is stopped at, for example, a time point 15 minutes from the beginning, the time point 15 minutes from the beginning of the navigation target video content data serves as the display constraining position (constraint control point). A period from 0:00:00 to 0:15:00 is a display permitting period, and the face images are displayed as usual in each column belonging to the display permitting period. A period from 0:15:00 to 0:65:00 (end position) is a display constraining period, and the face images to be displayed in each column belonging to the display constraining period are set into an invisible state.

In addition, the playback start point does not have to be strictly coincident with the display constraining position, and, for example, the border of a large section corresponding to the playback start point may be used as the display constraining position. For example, if the previous playback process is stopped at the time point, for example, 15 minutes from the beginning, it is possible to use, as the display constraining position, the border of a large section closest to the time point 15 minutes from the beginning of the navigation target video content data, among the borders of large sections after the time point 15 minutes from the beginning of the video content data.

Alternatively, the end position of the CM section immediately after the playback start point may be used as the display constraining position.

FIG. 12 shows an example of face image list display in the case of using the "rearmost playback termination point" as the display constraining position.

If the "rearmost playback termination point" of the navigation target video content data is a time point, for example, 50 minutes from the beginning, the time point 50 minutes from the beginning of the navigation target video content data serves as the display constraining position (constraint control point). A period from 0:00:00 to 0:50:00 is a display permitting period, and the face images are displayed as usual in each column belonging to the display permitting period. A period from 0:50:00 to 0:65:00 (end position) is a display constraining period, and the face images to be displayed in each column belonging to the display constraining period are set into an invisible state.

In addition, the "rearmost playback termination point" does not have to be strictly coincident with the display constraining position, and, for example, the border of a large section corresponding to the "rearmost playback termination point" may be used as the display constraining position. For example, it is possible to use, as the display constraining position, the border of a large section closest to the "rearmost playback termination point", among the borders of large sections after the "rearmost playback termination point".

Alternatively, the end position of the CM section immediately after the "rearmost playback termination point" may be used as the display constraining position.

Figure 13:
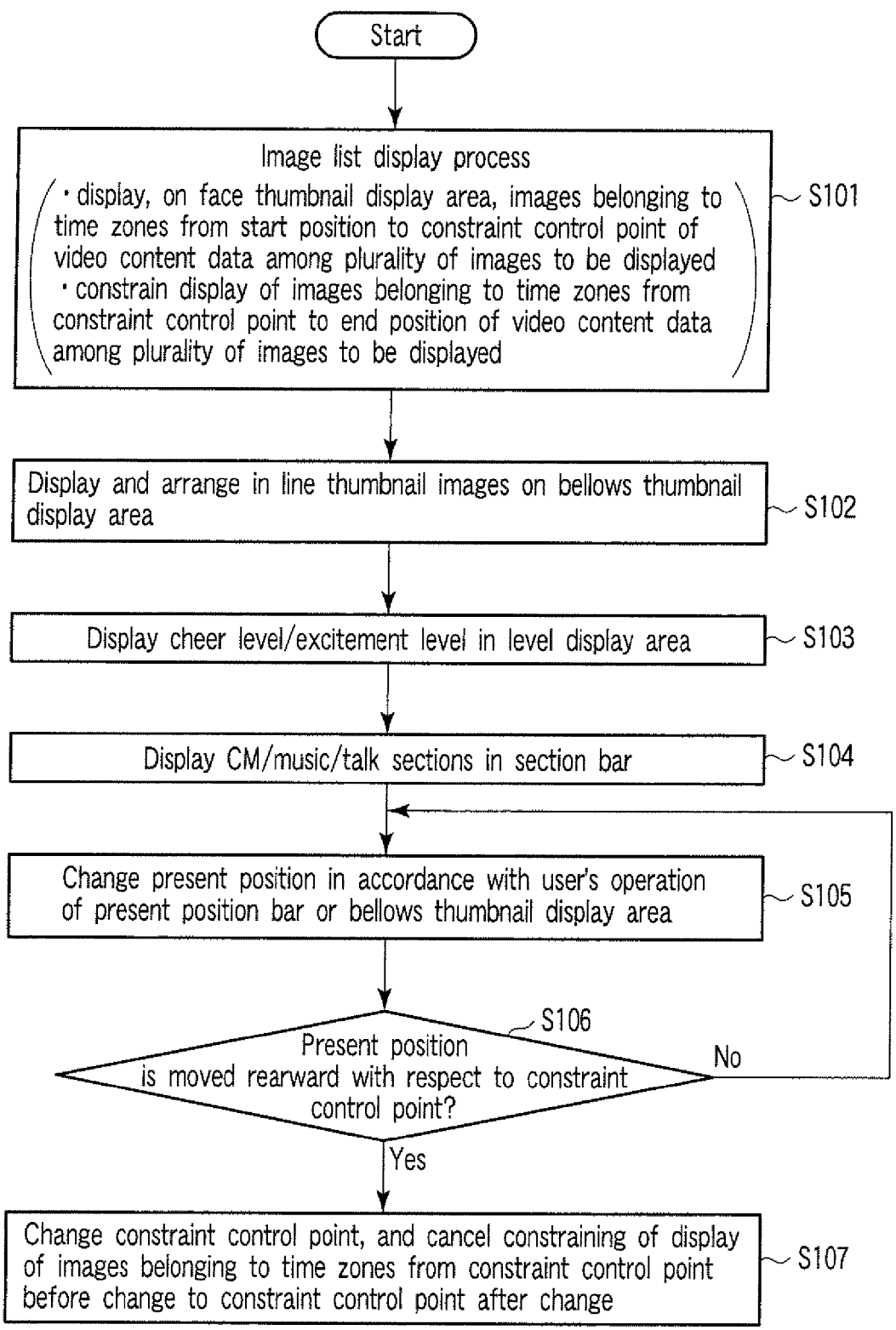
FIG. 13 is an exemplary flow chart illustrating an example of the procedure of a process of displaying a face image list which is executed by the electronic apparatus according to the embodiment.

Next, referring to a flow chart of FIG. 13, a description is given of the procedure of the display process which is executed by the face image list display process module 301.

When navigation target video content data is selected, the face image list display process module 301 executes a face image list display process for arranging and displaying, on the face thumbnail display area, a list of a plurality of face images corresponding to the selected navigation target video content data on the basis of the time stamp information of the plurality of face images (block S101).

In block S101, the face image list display process module 301 arranges and displays, on the face thumbnail display area, the face images corresponding to the time zone from the start position to the display constraining position (constraint control point) of the video content data. In the meantime, the face image list display process module 301 constrains the display of the face images belonging to the time zone from the display constraining position (constraint control point) to the end position of the video content data to set these face images into an invisible state.

Then, the face image list display process module 301 displays, on the basis of the time stamp information of the thumbnail images stored in the database 111A, the thumbnail images on the bellows thumbnail display area by arranging the thumbnail images in line in the order of time of appearance (block S102).

Then, the face image list display process module 301 reads out the cheer level information and excitement level information from the database 111A, and displays, on the level display area, a graph which indicates a variation in cheer level in the sequence from the start position to the end position of the video content data, and a graph which indicates a variation in excitement level in the sequence, in accordance with the cheer level information and excitement level information (block S103).

Subsequently, the face image list display process module 301 reads out the CM section attribute information, music section attribute information and talk section attribute information from the database 111A, and displays the section bars on the basis of the CM section attribute information, music section attribute information and talk section attribute information (block S104).

Thereafter, the face image list display process module 301 executes a process of changing the present position in accordance with the user's operation of moving a present position bar or selecting a thumbnail image on the bellows thumbnail display (block S105). In block S105, a process of changing the column to be selected is also executed in response to the change of the present position.

Then, the face image list display process module 301 determines whether the present position is moved rearward with respect to the display constraining position (constraint control point) (block S106). In other words, in block S106, the face image list display process module 301 determines whether a column to which the time zone belonging to the period after the display constraining position is allocated is selected. When the present position is moved rearward with respect to the display constraining position (constraint control point), that is, when a column to which the time zone belonging to the period after the display constraining position is allocated is selected, the face image list display process module 301 executes a process of moving the display constraining position (constraint control point) to the end position of the time zone allocated to the selected column in order to reduce the display constraining period so that the face images are displayed on the selected column (block S107). In block S107, a process is executed to cancel the constraining of the display of the face images belonging to the time zones from the display constraining position before the change to the display constraining position after the change. Specifically, a process is executed, for example, to cancel processing such as blurring or to arrange and display, on each column for which the display constraint is canceled, the face images belonging to the time zone allocated to that column.

As described above, in the present embodiment, among the representative images (face images) extracted from video content data, a list of representative images appearing in a period from a start position to a predetermined display constraining position of a sequence of the video content data is only displayed on the display area, and the display of the representative images appearing after the display constraining position is constrained. Thus, it is possible to present an outline of video content data to the user without impairing the viewing/listening value of the video content data.

In addition, in order to constrain the display of the representative images appearing after the display constraining position, it is possible to use not only a method which subjects these images to processing, such as blurring, hiding or downscaling, but also a method which forms a face image display area only by a plurality of columns belonging to the period from the start position to the display constraining position of the video content data and displays this face image display area on the indexing view screen.

FIG. 14 shows other examples of the constraining of the display of a face image.

In FIG. 14, (A) shows an example of a face image without display constraint. (B) shows an example of the constraining of the display of only part of the face image. In the display constraint of (B), for example, part of the face image (e.g. eyes) is hidden. (C) shows an example of the constraining of the display of the whole face image. (D) shows an example of the constraining of the display of the display area including the face image.

As described above, various methods can be used as the method of constraining the display of the representative images appearing after the display constraining position.

In the face thumbnail display area of the present embodiment, use is made of the time axis having the base point at the left end position and the end point of video content data at the right end position. Alternatively, for example, the base point may be set at the left end position and the end point may be set at the right end position with respect to a part of the video content data. In addition, the left and the right may be reversed. Further, the arrangement in the up-and-down direction and in the left-and-right direction may be reversed.

The procedure of the face image list display process of the present embodiment can all be realized by software. Therefore, by installing the software in an ordinary computer via a computer-readable memory medium, the same advantageous effects as in the present embodiment can easily be realized.

The electronic apparatus of the present embodiment can be realized not only by the computer 10, but also by various consumer electronic apparatuses such as an HDD recorder, a DVD recorder and a TV apparatus. In this case, the functions of the TV application program 202 can be realized by hardware such as a DSP or a microcomputer.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising:
   an image extraction hardware module configured to extract a plurality of representative images from a sequence of video content data, and to output time stamp information which is indicative of a time point at which each of the plurality of extracted representative images appears;
   an image list display process hardware module configured divide the plurality of extracted representative images into a first representative image group appearing in a period from a start position to a predetermined display constraining position of the sequence of video content data and a second representative image group appearing after the display constraining position, to display a list of representative images in the first representative image group on a display area, and to display a list of representative images in the second representative image group on the display area with each of the representative images processed to make the display of each of the representative images difficult to recognize; and
   a playback hardware module configured to start to play back the video content data from a time point corresponding to a representative image selected by a user from the lists of representative images displayed on the display area, in response to input of a playback request event,
   wherein the image list display process hardware module is configured to determine whether the video content data is played-back video content data which has been played back or un-played-back video content data which has never been played back, and to display, on the display area, the list of representative images belonging to the second representative image group with each of the representative images processed to make the display of each of the representative images difficult to recognize.

2. The electronic apparatus of claim 1, wherein the display area includes a plurality of image display areas which are arranged in a matrix including a plurality of rows and a plurality of columns, a plurality of time zones, which constitute a total time length of the video content data, being allocated to the plurality of columns, respectively, and the image list display process hardware module is configured to execute a process of arranging and displaying, on the image display areas of each of the columns to which a time zone belonging to the period from the start position to the display constraining position of the sequence of the video content data is allocated, the representative images belonging to the time zone allocated to each column, a process of arranging and displaying, on the image display areas of each of the columns to which a time zone after the predetermined display constraining position is allocated, representative images belonging to a time zone allocated to each of the columns with the representative images processed, a process of selecting a predetermined column among the plurality of columns in accordance with a user operation, and a process of, when a column to which a time zone belonging to a period after the display constraining position is allocated is selected, moving the display constraining position to an end position of the time zone allocated to the selected column.

3. The electronic apparatus of claim 1, further comprising:
a hardware module configured to extract a plurality of frames from the video content data and output time stamp information which is indicative of a time point at which each of the extracted frames appears;
a hardware module configured to display, on a thumbnail display area, a list of thumbnail images corresponding to the extracted frames; and
a hardware module configured to, when a thumbnail image corresponding to a frame appearing after the display constraining position is selected from the list of thumbnail images on the thumbnail display area, change the display constraining position to a position corresponding to the selected thumbnail image.

4. The electronic apparatus of claim 1, wherein the image list display process hardware module displays, on the display area, a representative image which belongs to a predetermined attribute section and is included in representative images appearing in a period after the display constraining position, without being processed.

5. An electronic apparatus comprising:
an image extraction hardware module configured to extract a plurality of face images from a sequence of video content data, and to output time stamp information which is indicative of a time point at which each of the plurality of extracted face images appears;
an image list display process hardware module configured to divide the plurality of extracted face images into a first face image group appearing in a period from a start position to a predetermined display constraining position of the sequence of video content data and a second face image group appearing after the display constraining position, to display a list of face images in the first face image group on a display area, and to display a list of face images in the second face image group on the display area with each of the face images processed to constrain the display of each of the face images; and
a playback hardware module configured to, when a playback request event indicating playback of the video content data is input while one of the face images displayed in the display area is being selected by a user, start the playback of the video content data from a time point corresponding to the selected face image,
wherein the display area includes a plurality of image display areas which are arranged in a matrix including a plurality of rows and a plurality of columns, a plurality of time zones, which constitute a total time length of the video content data, being allocated to the plurality columns, respectively, and the image list display process hardware module is configured to execute a process of arranging and displaying, on the image display area of each of the columns to which a time zone belonging to the period from the start position to the predetermined display constraining position of the sequence of the video content data is allocated, the face images belonging to the time zone allocated to each column on the basis of the time stamp information corresponding to the plurality of face images, a process of arranging and displaying, on the image display areas of each of the columns to which a time zone after the predetermined display constraining position is allocated, face images belonging to a time zone allocated to each of the columns with the face images processed, a process of selecting a predetermined column among the plurality of columns in accordance with a user operation, and a process of, when a column to which a time zone belonging to a period after the display constraining position is allocated is selected, moving the display constraining position to an end position of the time zone allocated to the selected column.

6. A method of displaying by an electronic apparatus a list of images which appear in video content data, the method comprising:
extracting a plurality of representative images from a sequence of the video content data, and outputting time stamp information which is indicative of a time point at which each of the plurality of extracted representative images appears;
dividing the plurality of extracted representative images into a first representative image group appearing in a period from a start position to a predetermined display constraining position of the sequence of video content data and a second representative image group appearing after the display constraining position, displaying a list of representative images in the first representative image group on a display area being displayed on a display device, and displaying a list of representative images in the second representative image group on the display area with each of the representative images processed to make the display of each of the representative images difficult to recognize; and
starting to play back the video content data from a time point corresponding to a representative image selected by a user from the lists of representative images displayed on the display area, in response to input of a playback request event,
wherein the image list displaying includes determining whether the video content data is played-back video content data which has been played back or un-played-back video content data which has never been played back, and displaying, on the display area, the list of representative images belonging to the second representative image group with each of the representative images processed to make the display of each of the representative images difficult to recognize.

7. The image display method of claim 6, further comprising:
extracting a plurality of frames from the video content data and outputting time stamp information which is indicative of a time point at which each of the extracted representative images appears;
displaying, on a thumbnail display area, a list of thumbnail images corresponding to the extracted frames; and
when a thumbnail image corresponding to a frame appearing after the display constraining position is selected from a list of thumbnail images on the thumbnail display area, changing the display constraining position to a position corresponding to the selected thumbnail image.

8. The image display method of claim 6, wherein the display area includes a plurality of image display areas which are arranged in a matrix including a plurality of rows and a plurality of columns, a plurality of time zones, which constitute a total time length of the video content data, being allocated to the plurality of columns, respectively, and
the image list displaying includes arranging and displaying, on the image display areas of each of the columns to which a time zone belonging to the period from the start position to the display constraining position of the sequence of the video content data is allocated, the representative images belonging to the time zone allocated to each column, arranging and displaying, on the image display areas of each of the columns to which a time zone after the predetermined display constraining position is allocated, representative images belonging to a time zone allocated to each of the columns with the representative images processed, selecting a predetermined column among the plurality of columns in accordance with a user operation, and moving, when a column to which a time zone belonging to a period after the display constraining position is allocated is selected, the display constraining position to an end position of the time zone allocated to the selected column.

* * * * *